(12) United States Patent
Neuneker et al.

(10) Patent No.: US 11,367,369 B2
(45) Date of Patent: Jun. 21, 2022

(54) ILLUMINABLE IMAGE

(71) Applicant: Hewlett-Packard Development Company, L.P., Spring, TX (US)

(72) Inventors: Jonathan Neuneker, Boise, ID (US); Shaun Henry, Boise, ID (US); Greg Creager, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 199 days.

(21) Appl. No.: 16/478,426

(22) PCT Filed: Jan. 23, 2017

(86) PCT No.: PCT/US2017/014553
§ 371 (c)(1),
(2) Date: Jul. 16, 2019

(87) PCT Pub. No.: WO2018/136096
PCT Pub. Date: Jul. 26, 2018

(65) Prior Publication Data
US 2019/0371215 A1 Dec. 5, 2019

(51) Int. Cl.
*G09F 13/04* (2006.01)
*G09F 13/02* (2006.01)
*G09F 13/00* (2006.01)
*B41M 5/00* (2006.01)
*B44F 1/06* (2006.01)
*B41M 3/00* (2006.01)
*F21V 8/00* (2006.01)

(52) U.S. Cl.
CPC .............. *G09F 13/04* (2013.01); *B41M 3/008* (2013.01); *B41M 5/0029* (2013.01); *B44F 1/06* (2013.01); *G09F 13/00* (2013.01); *G09F 13/02* (2013.01); *G02B 6/006* (2013.01); *G02B 6/0021* (2013.01)

(58) Field of Classification Search
CPC ........ B41M 3/008; B41M 5/0029; B44F 1/06; G02B 6/0021; G02B 6/006; G09F 13/00; G09F 13/02; G09F 13/04
USPC ............................................ 362/1, 600–607
See application file for complete search history.

(56) References Cited

U.S. PATENT DOCUMENTS

| 5,036,440 A * | 7/1991 | Takii .................. F21V 9/08 362/95 |
| 6,212,805 B1 | 4/2001 | Hill |
| 6,508,171 B1 | 1/2003 | Georges |
| 7,108,414 B2 * | 9/2006 | McCollum ........... G02B 6/0036 362/604 |
| 8,254,622 B2 | 9/2012 | Gourlay |
| 9,086,516 B2 | 7/2015 | Gourlay |

FOREIGN PATENT DOCUMENTS

| CN | 203551830 | 4/2014 |
| WO | WO-2008131121 | 10/2008 |

OTHER PUBLICATIONS

HP Indigo Digital Offset Colour Technology, Retrieved from the Internet on Nov. 28, 2016; http:/www8.hp.com/ ~ 16 pages.

* cited by examiner

*Primary Examiner* — Jason M Han
(74) *Attorney, Agent, or Firm* — Dicke Billig & Czaja PLLC (57) ABSTRACT

An illuminable image includes a substrate, a transparent light directing channel printed on the substrate, and an image printed over at least a portion of the printed transparent light directing channel.

12 Claims, 9 Drawing Sheets

ILLUMINABLE IMAGE

BACKGROUND

A printed image may include characters, symbols, and/or other graphics formed on a print media such as paper or other printable media.

DETAILED DESCRIPTION

Figure 1:
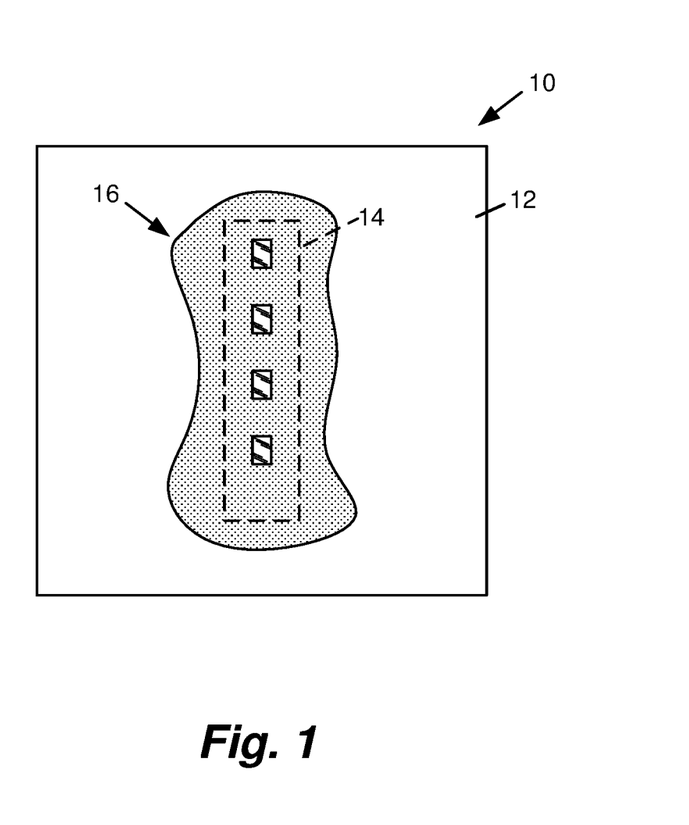
FIG. 1 is a schematic illustration of one example of an illuminable image.

As illustrated in the example of FIG. 1, the present disclosure provides an illuminable image 10. In one implementation, the illuminable image includes a substrate 12, a transparent light directing channel 14 printed on the substrate, and an image 16 printed over at least a portion of the printed transparent light directing channel. As such, light from a light source can be directed through the light channel to illuminate the image. In one implementation, the light source is an active light source (such as an LED) and, in another implementation, the light source is a passive light source (such as ambient light).

FIGS. 2A, 2B, 3A, 3B schematically illustrate one example of forming an illuminable image 100. In one example, illuminable image 100 is formed on a substrate 110. Substrate 110 may include, for example, sheet material, such as paper, including photographic paper, card stock, transparencies, Mylar, and the like, as well as fabric, packaging material, and other printable media.

Figure 2A:
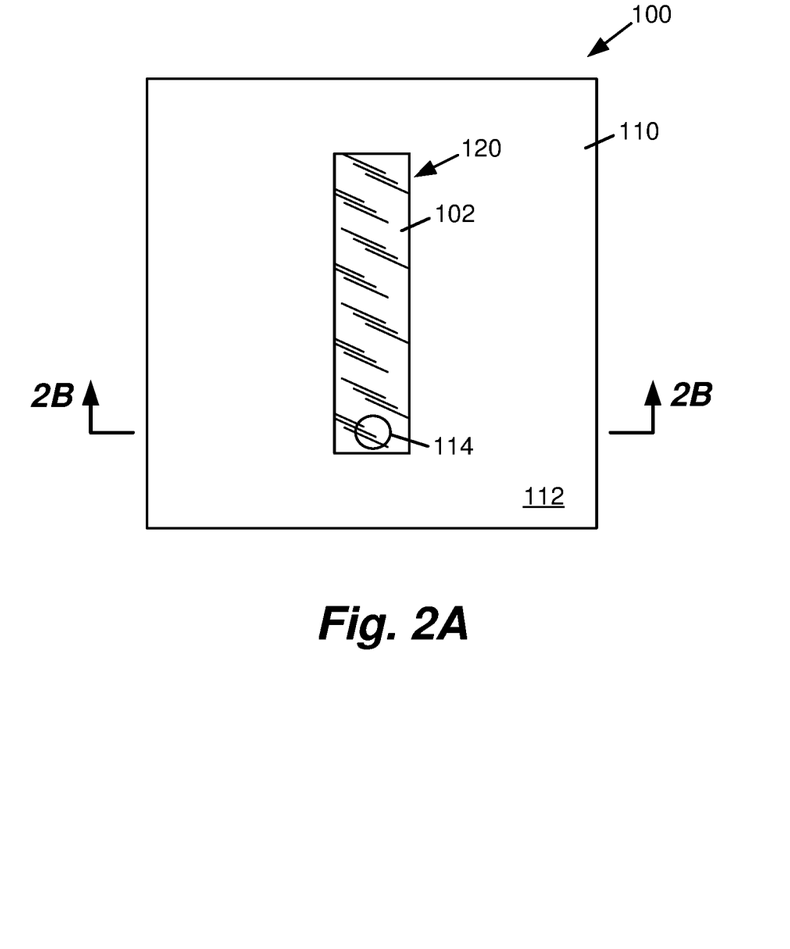
FIGS. 2A, 2B, 3A, 3B schematically illustrate an example of forming an illuminable image.
Figure 2B:
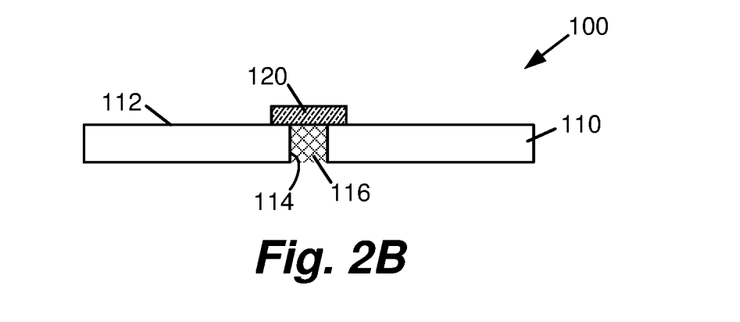

As illustrated in the example of FIGS. 2A and 2B, illuminable image 100 includes a light directing channel 120, with light directing channel 120 formed on substrate 110. More specifically, light directing channel 120 is formed on a surface 112 of substrate 110.

In one example, light directing channel 120 is formed by printing on substrate 110 including, more specifically, printing on surface 112 of substrate 110. In one implementation, light directing channel 120 is transparent and is formed by depositing one layer (i.e., a single layer) or more than one layer (i.e., multiple layers) of transparent ink 102 on substrate 110. As such, light directing channel 120 provides a light channel on substrate 110 for directing light to and/or through an image, as described below.

Transparent ink 102 is free of dyes and pigments, and may be deposited by, for example, an inkjet printer, an offset printer such as a liquid electrophotographic (LEP) printer, a laser printer, a three-dimensional (3-D) printer or other type of printer. In one example, the transparent ink is deposited by an LEP printer where an electrically-charged liquid ink is dried and applied to a substrate via a thermal blanket. In another example, the transparent ink is deposited by a 3-D printer where drops of fluid are ejected onto a layer (or layers) of a build material, whereby energy, such as heat, is applied to the layer (or layers) of build material such that the build material is fused or sintered. The build material may comprise a powder-based build material including wet and/or dry powder-based materials, particulate materials, and/or granular materials.

In one example, as illustrated in FIG. 2B, a hole or opening 114 is formed through or provided in substrate 110. In one implementation, light directing channel 120 is formed over hole or opening 114 such that hole or opening 114 is temporarily filled with a fill material 116 during forming of light directing channel 120.

Figure 3A:
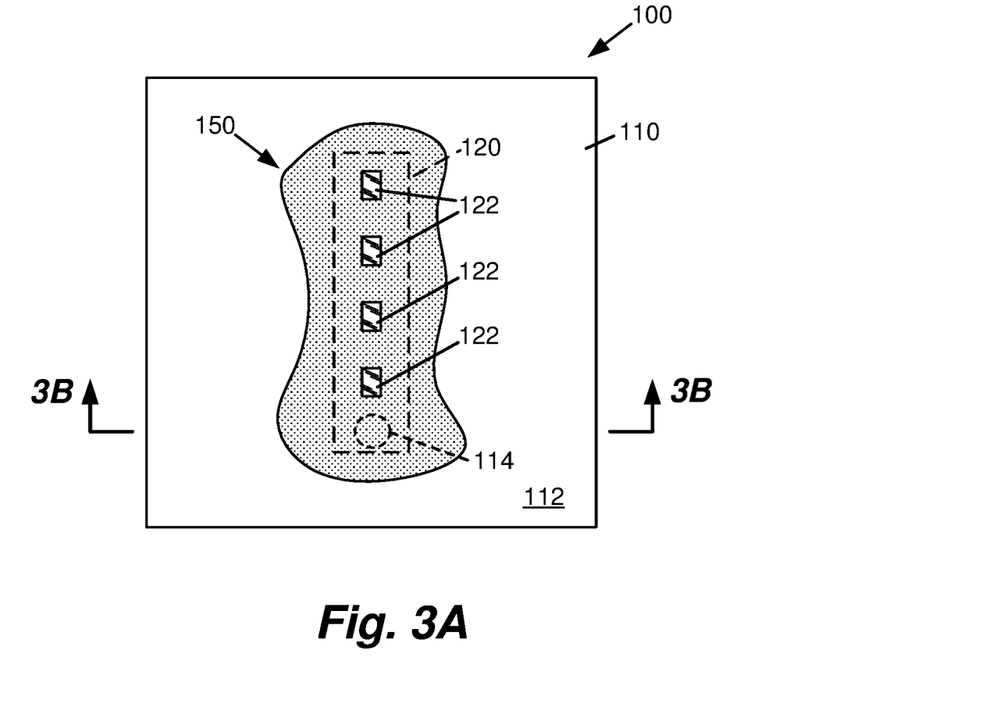
Figure 3B:
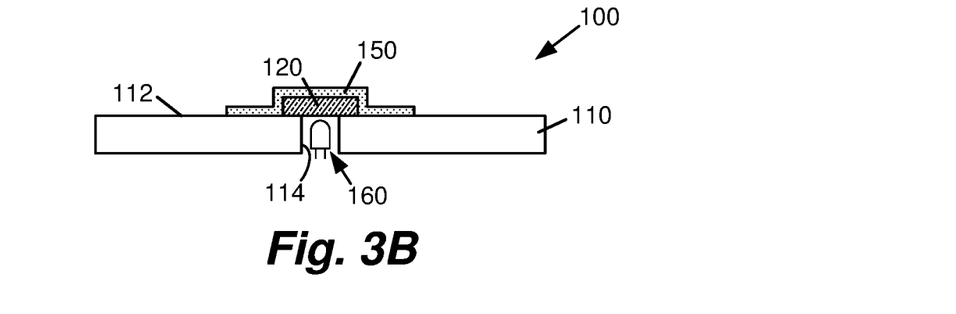

As illustrated in the example of FIGS. 3A and 3B, an image 150 is formed on substrate 110, including, more specifically, on surface 112 of substrate 110, and over light directing channel 120. More specifically, at least a portion of image 150 is formed over light directing channel 120. Image 150 may include characters, symbols, and/or other graphics formed on substrate 110 and over light directing channel 120. Image 150 may be formed of various colors, including black or grayscale colors.

In one example, image 150 is formed by printing on substrate 110 and over light directing channel 120. More specifically, in one implementation, image 150 is a visible image and formed by depositing visible ink on substrate 110 and over light directing channel 120. Visible ink includes dyes or pigments, and may be deposited by, for example, an inkjet printer, an offset printer such as a liquid electrophotographic (LEP) printer, a laser printer, a 3-D printer or other type of printer.

In one example, image 150 is formed such that a portion, segment or area (or portions, segments or areas) 122 of light directing channel 120 is (are) exposed through image 150. With image 150 printed over light directing channel 120, and with portions, segments or areas 122 of light directing channel 120 exposed through image 150, image 150 may be illuminated, as described below.

In one implementation, as illustrated in the example of FIG. 3B, fill material 116 is removed from opening 114, and a light source 160, such as an LED light, as an example of an active light source, is inserted in or communicated with opening 114. As such, light from light source 160 is directed through light directing channel 120. Accordingly, with light directing channel 120 provided under image 150, including, more specifically, under at least a portion of image 150, and with portions, segments or areas 122 of light directing channel 120 exposed through image 150, light from light source 160 illuminates image 150.

In another implementation, light source 160 may be embedded in substrate 110 (for example, before forming of light directing channel 120 on substrate 110). In another implementation, light source 160 may be positioned on surface 112 of substrate 110 (for example, at an end of light directing channel 120). In some implementations, light source 160 may be cycled (for example, on and off) to control or vary illumination of image 150.

Although illustrated as being rectangular in shape, light directing channel 120 may be of other shapes and/or sizes. In addition, although illustrated as including a single light directing channel 120, illuminable image 100 may include any number of light directing channels 120, including one (i.e., a single) light directing channel 120 or more than one (i.e., multiple) light directing channel 120.

Although illustrated as being circular in shape, opening 114 may be of other shapes and/or sizes. In addition, substrate 110 may include one such hole or opening or more than one such hole or opening.

Although illustrated as being irregular in shape, image 150 may be of other shapes, sizes, configurations and/or arrangements or combination of shapes, sizes, configurations and/or arrangements.

FIGS. 4A, 4B, 5A, 5B schematically illustrate one example of forming an illuminable image 200. In one example, illuminable image 200 is formed on a substrate 210. Substrate 210, similar to substrate 110, may include, for example, sheet material, such as paper, including photographic paper, card stock, transparencies, Mylar, and the like, as well as fabric, packaging material, and other printable media.

Figure 4A:
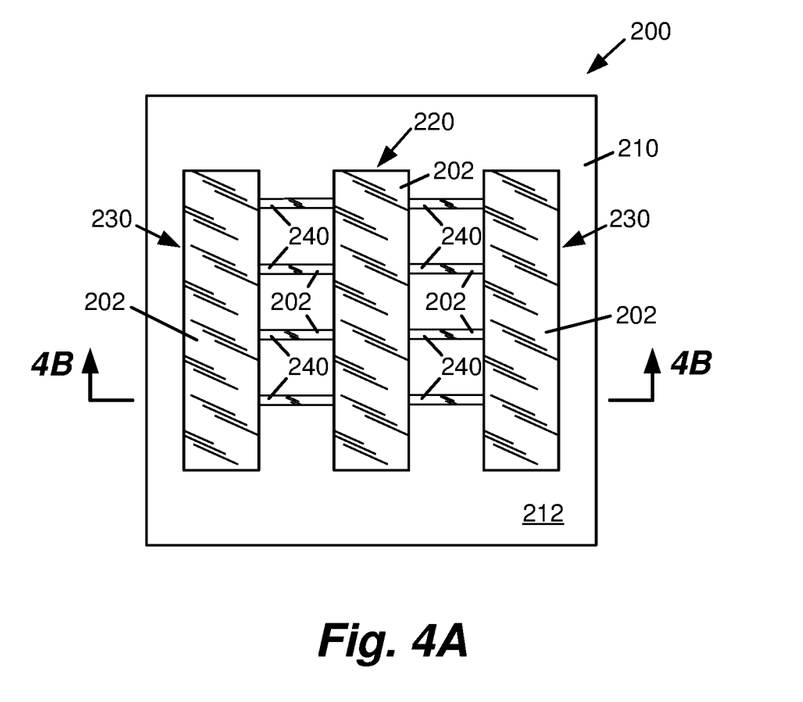
FIGS. 4A, 4B, 5A, 5B schematically illustrate an example of forming an illuminable image.
Figure 4B:
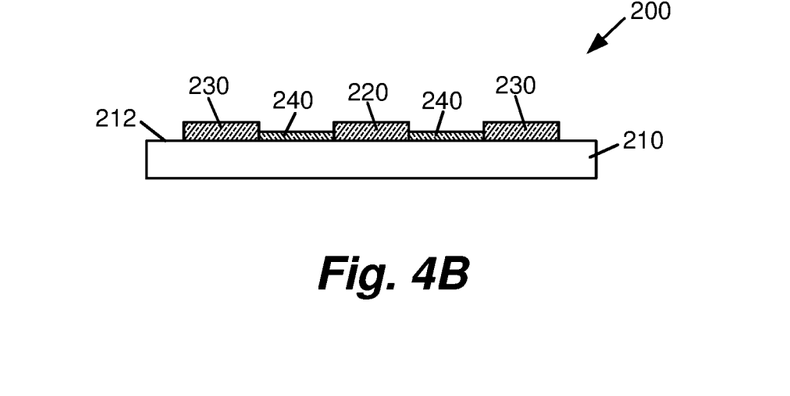

As illustrated in the example of FIGS. 4A and 4B, illuminable image 200 includes a light directing channel 220, a light gathering channel (or channels) 230, and a light transferring channel (or channels) 240, with light directing channel 220, light gathering channel 230, and light transferring channel 240 each formed on substrate 210. More specifically, light directing channel 220, light gathering channel 230, and light transferring channel 240 are each formed on a surface 212 of substrate 210. As illustrated in the example of FIGS. 4A and 4B, light transferring channel 240 extends between light gathering channel 230 and light directing channel 220 to transfer light from light gathering channel 230 to light directing channel 220, as further described below.

In one example, and similar to light directing channel 120, light directing channel 220, light gathering channel 230, and light transferring channel 240 are each formed by printing on substrate 210. In one implementation, and similar to light directing channel 120, light directing channel 220, light gathering channel 230, and light transferring channel 240 are transparent and are each formed by depositing one layer (i.e., a single layer) or more than one layer (i.e., multiple layers) of transparent ink 202 on substrate 210. As such, light gathering channel 230 provides a light channel on substrate 210 for gathering light (for example, ambient light or direct light), light transferring channel 240 provides a light channel on substrate 210 for transferring gathered light from light gathering channel 230 to light directing channel 220, and light directing channel 220 provides a light channel on substrate 210 for directing light to and/or through an image, as described below.

Figure 5A:
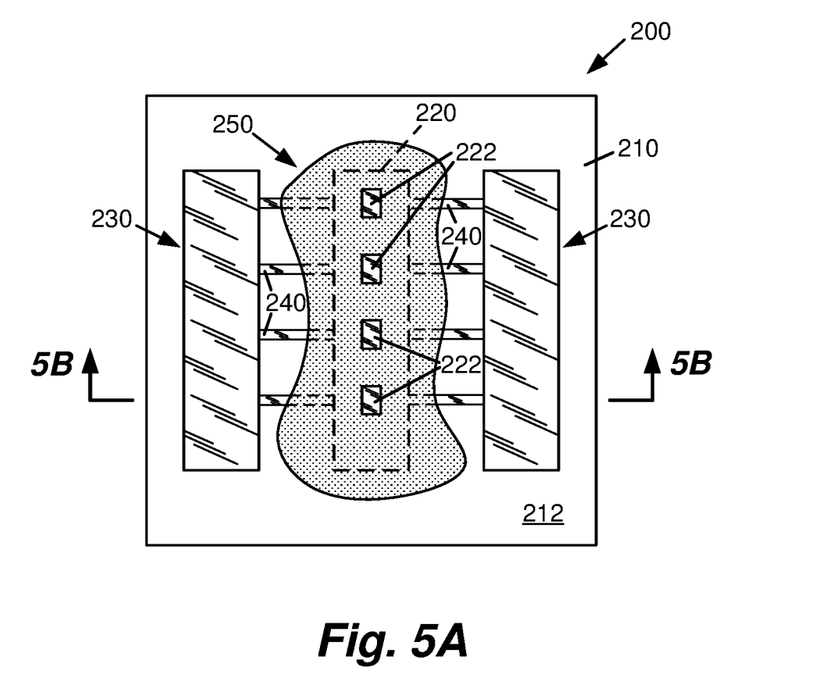
Figure 5B:
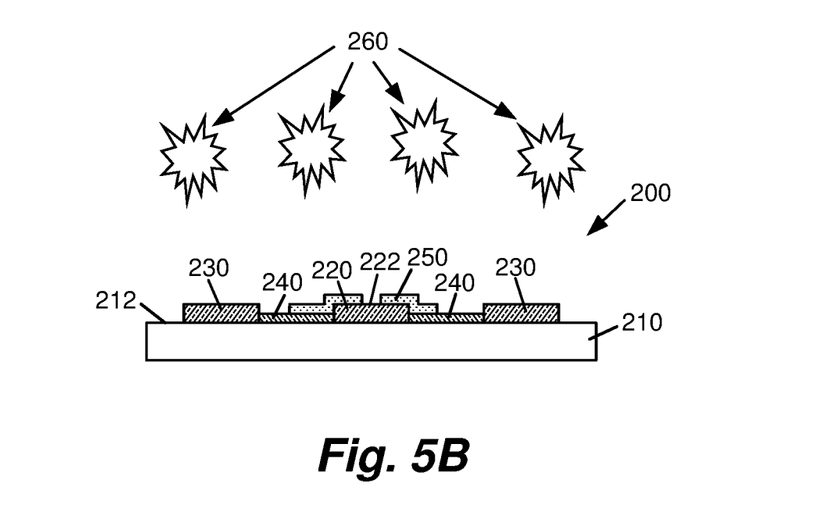

As illustrated in the example of FIGS. 5A and 5B, an image 250 is formed on substrate 210, including, more specifically, on surface 212 of substrate 210, and over light directing channel 220. More specifically, at least a portion of image 250 is formed over light directing channel 220. Image 250 may include characters, symbols, and/or other graphics formed on substrate 210 and over light directing channel 220. Image 250 may be formed of various colors, including black or grayscale colors.

In one example, and similar to image 150, image 250 is formed by printing on substrate 210 and over light directing channel 220 (including over a portion of light transferring channel 240). More specifically, in one implementation, and similar to image 150, image 250 is a visible image and formed by depositing visible ink on substrate 210 and over light directing channel 220 (including over a portion of light transferring channel 240).

In one example, and similar to image 150, image 250 is formed such that a portion, segment or area (or portions, segments or areas) 222 of light directing channel 220 is (are) exposed through image 250. With image 250 printed over light directing channel 220, and with portions, segments or areas 222 of light directing channel 220 exposed through image 250, image 250 may be illuminated, as described below.

In one implementation, ambient light 260, as an example of a light source, is gathered by light gathering channel 230. As such, gathered ambient light is transferred from light gathering channel 230 to light directing channel 220 by light transferring channel 240 and directed through light directing channel 220. Accordingly, with light directing channel 220 provided under image 250, including, more specifically, under at least a portion of image 250, and with portions, segments or areas 222 of light directing channel 220 exposed through image 250, ambient light 260 illuminates image 250.

Although illustrated as being rectangular in shape, light directing channel 220, light gathering channel 230, and/or light transferring channel 240 each may be of other shapes and/or sizes. In addition, although illustrated as being a single light directing channel, light directing channel 220 may include multiple light directing channels. Furthermore, although illustrated as including two light gathering channels 230, illuminable image 200 may include any number of light gathering channels 230, including one (i.e., a single) light gathering channel 230 or more than one (i.e., multiple) light gathering channel 230. In addition, although illustrated as including four light transferring channels 240 communicated with light directing channel 220, illuminable image 200 may include any number of light transferring channels 240 communicated with light directing channel 220.

Although illustrated as being irregular in shape, image 250 may be of other shapes, sizes, configurations and/or arrangements or combination of shapes, sizes, configurations and/or arrangements.

FIGS. 6A, 6B, 7A, 7B schematically illustrate one example of forming an illuminable image 300. In one example, illuminable image 300 is formed on a substrate 310. Substrate 310, similar to substrate 110, may include, for example, sheet material, such as paper, including photographic paper, card stock, transparencies, Mylar, and the like, as well as fabric, packaging material, and other printable media.

Figure 6A:
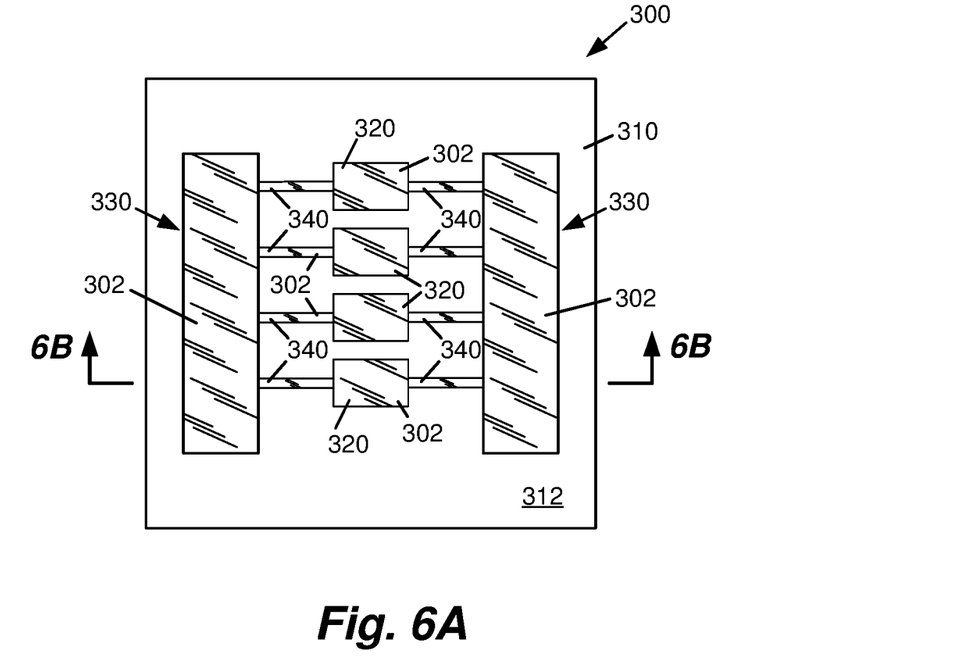
FIGS. 6A, 6B, 7A, 7B schematically illustrate an example of forming an illuminable image.
Figure 6B:
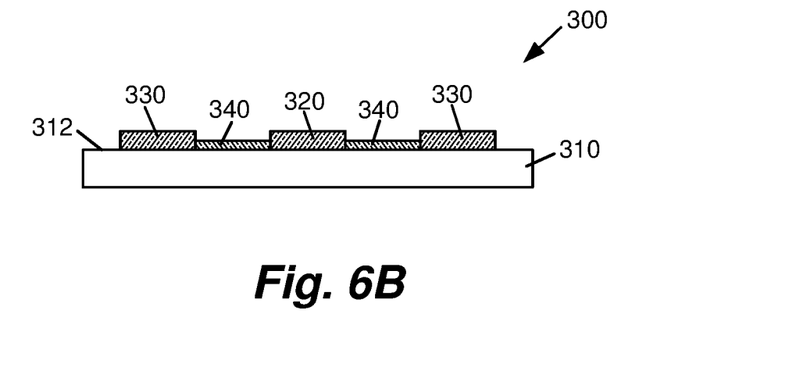

As illustrated in the example of FIGS. 6A and 6B, illuminable image 300 includes light directing channels 320, a light gathering channel (or channels) 330, and light transferring channels 340, with light directing channels 320, light gathering channel (or channels) 330, and light transferring channels 340 each formed on substrate 310. More specifically, light directing channels 320, light gathering channel (or channels) 330, and light transferring channels 340 are each formed on a surface 312 of substrate 310. As illustrated in the example of FIGS. 6A and 6B, light transferring channels 340 extend between light gathering channel 330 and a respective light directing channel 320 to transfer light from light gathering channel 330 to a respective light directing channel 320, as further described below.

In one example, and similar to light directing channel 120, light directing channels 320, light gathering channel (or channels) 330, and light transferring channels 340 are each formed by printing on substrate 310. In one implementation, and similar to light directing channel 120, light directing channels 320, light gathering channel (or channels) 330, and light transferring channels 340 are transparent and are each formed by depositing one layer (i.e., a single layer) or more than one layer (i.e., multiple layers) of transparent ink 302 on substrate 310. As such, light gathering channel (or channels) 330 provides a light channel on substrate 310 for gathering light (for example, ambient light or direct light), light transferring channels 340 each provide a light channel on substrate 310 for transferring gathered light from light gathering channel 330 to a respective light directing channel 320, and light directing channels 320 each provide a light channel on substrate 310 for directing light to and/or through an image, as described below.

Figure 7A:
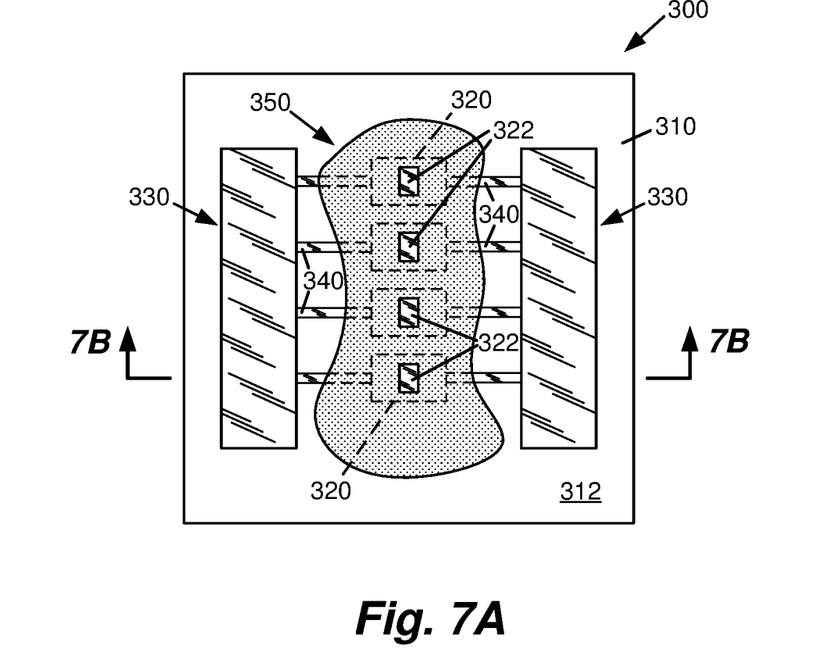
Figure 7B:
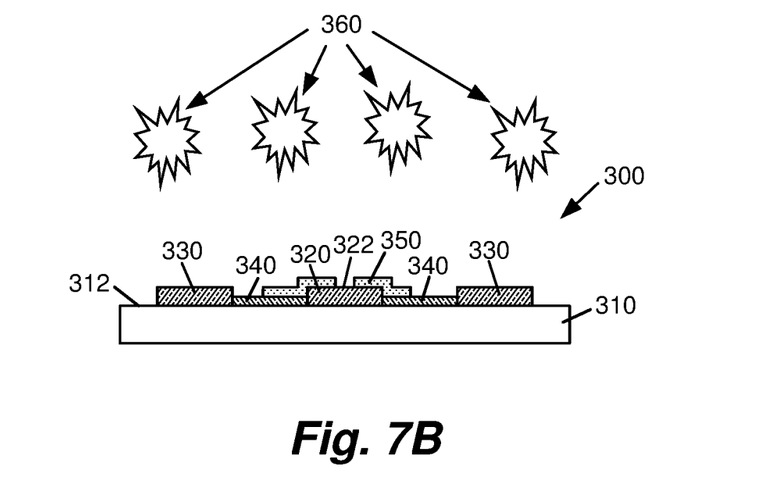

As illustrated in the example of FIGS. 7A and 7B, an image 350 is formed on substrate 310, including, more specifically, on surface 312 of substrate 310, and over light directing channels 320. More specifically, at least a portion of image 350 is formed over light directing channels 320. Image 350 may include characters, symbols, and/or other graphics formed on substrate 310 and over light directing channels 320. Image 350 may be formed of various colors, including black or grayscale colors.

In one example, and similar to image 150, image 350 is formed by printing on substrate 310 and over light directing channels 320 (including over a portion of light transferring channels 340). More specifically, in one implementation, and similar to image 150, image 350 is a visible image and formed by depositing visible ink on substrate 310 and over light directing channels 320 (including over a portion of light transferring channels 340). In one example, and similar to image 150, image 350 is formed such that a portion, segment or area (or portions, segments or areas) 322 of a respective light directing channel 320 is (are) exposed through image 350. With image 350 printed over light directing channels 320, and with portions, segments or areas 322 of respective light directing channels 320 exposed through image 350, image 350 may be illuminated, as described below.

In one implementation, ambient light 360, as an example of a light source, is gathered by light gathering channel (or channels) 330. As such, gathered ambient light is transferred from light gathering channel (or channels) 330 to light directing channels 320 by respective light transferring channels 340 and directed through respective light directing channels 320. Accordingly, with light directing channels 320 provided under image 350, including, more specifically, under at least a portion of image 350, and with portions, segments or areas 322 of respective light directing channels 320 exposed through image 350, ambient light 360 illuminates image 350.

Although illustrated as being rectangular in shape, light directing channels 320, light gathering channel (or channels) 330, and/or light transferring channels 340 each may be of other shapes and/or sizes. In addition, although illustrated as including two light gathering channels 330, illuminable image 300 may include any number of light gathering channels 330, including one (i.e., a single) light gathering channel 330 or more than one (i.e., multiple) light gathering channel 330. Furthermore, although illustrated as including two light transferring channels 340 communicated with each light directing channel 320, illuminable image 300 may include any number of light transferring channels 340 communicated with each light directing channel 320.

Although illustrated as being irregular in shape, image 350 may be of other shapes, sizes, configurations and/or arrangements or combination of shapes, sizes, configurations and/or arrangements.

Figure 8:
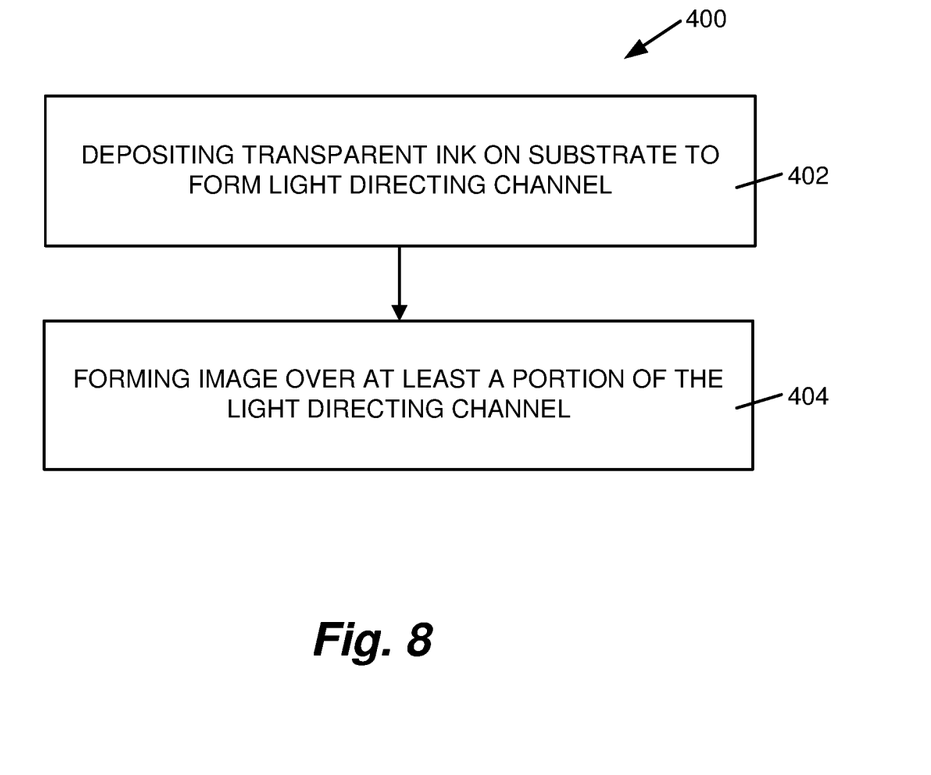
FIG. 8 is a flow diagram illustrating an example of a method of forming an illuminable image.

FIG. 8 is a flow diagram illustrating an example of a method 400 of forming an illuminable image, such as illuminable image 100, as illustrated, for example, in FIGS. 2A, 2B, 3A, 3B, illuminable image 200, as illustrated, for example, in FIGS. 4A, 4B, 5A, 5B, and illuminable image 300, as illustrated, for example, in FIGS. 6A, 6B, 7A, 7B.

At 402, method 400 includes depositing transparent ink on a substrate to form a light directing channel, such as transparent ink 102 deposited on substrate 110 to form light directing channel 120, as illustrated, for example, in FIGS. 2A, 2B, transparent ink 202 deposited on substrate 210 to form light directing channel 220, as illustrated, for example, in FIGS. 4A, 4B, and transparent ink 302 deposited on substrate 310 to form respective light directing channels 320, as illustrated, for example, in FIGS. 6A, 6B. In one implementation, depositing the transparent ink, for example, at 402, includes printing a layer, including one layer (i.e., a single layer) or more than one layer (i.e., multiple layers), of the transparent ink on the substrate.

At 404, method 400 includes forming an image over at least a portion of the light directing channel, such as image 150 formed over at least a portion of light directing channel 120, as illustrated, for example, in FIGS. 3A, 3B, image 250 formed over at least a portion of light directing channel 220, as illustrated, for example, in FIGS. 5A, 5B, and image 350 formed over at least a portion of a respective light directing channel 320, as illustrated, for example, in FIGS. 7A, 7B. In one implementation, forming the image, for example, at 404, includes printing the image on the substrate and over at least a portion of the light directing channel.

In one example, forming the image, for example, at 404, includes exposing an area of the light directing channel through the image, such as area 122 of light directing channel 120 exposed through image 150, as illustrated, for example, in FIG. 3A, area 222 of light directing channel 220 exposed through image 250, as illustrated, for example, in FIGS. 5A, 5B, and area 322 of a respective light directing channel 320 exposed through image 350, as illustrated, for example, in FIGS. 7A, 7B.

Figure 9:
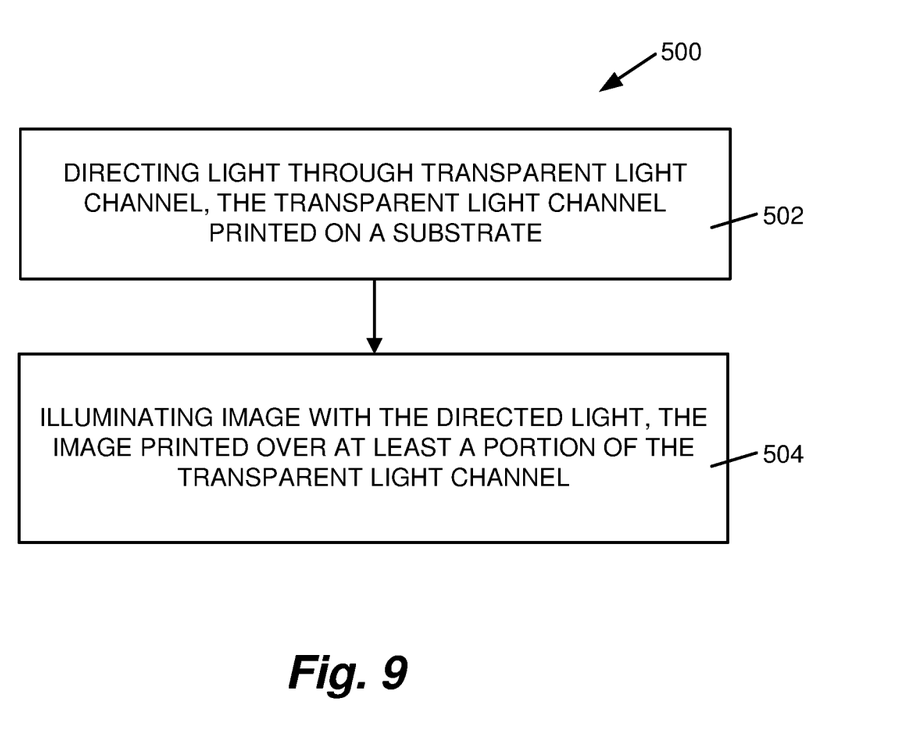
FIG. 9 is a flow diagram illustrating an example of a method of illuminating an image.

FIG. 9 is a flow diagram illustrating an example of a method 500 of illuminating an image, such as image 150, as illustrated, for example, in FIGS. 3A, 3B, image 250, as illustrated, for example, in FIGS. 5A, 5B, and image 350, as illustrated, for example, in FIGS. 7A, 7B.

At 502, method 500 includes directing light through a transparent light channel, where the transparent light channel is printed on a substrate, such as directing light through light directing channel 120 printed on substrate 110, as illustrated, for example, in FIG. 3B, directing light through light directing channel 220 printed on substrate 210, as illustrated, for example, in FIG. 5B, and directing light through a respective light directing channel 320 printed on substrate 310, as illustrated, for example, in FIG. 7B.

In one implementation, directing light through the transparent light channel, for example, at 502, includes directing active light through the transparent light channel, such as directing light from light source 160 through light directing channel 120, as illustrated, for example, in FIG. 3B. In one implementation, directing light through the transparent light channel, for example, at 502, includes directing ambient light through the transparent light channel, such as directing ambient light 260 through light directing channel 220, as illustrated, for example, in FIG. 5B, and directing ambient light 360 through a respective light directing channel 320, as illustrated, for example, in FIG. 7B.

At 504, method 500 includes illuminating an image with the directed light, where the image is printed over at least a portion of the transparent light channel, such as illuminating image 150 printed over at least a portion of light directing channel 120, as illustrated, for example, in FIGS. 3A, 3B, illuminating image 250 printed over at least a portion of light directing channel 220, as illustrated, for example, in FIGS. 5A, 5B, and illuminating image 350 printed over at least a portion of a respective light directing channel 320, as illustrated, for example, in FIGS. 7A, 7B.

In one example, illuminating the image with the directed light, for example, at 504, includes exiting light from an area of the transparent light channel exposed through the image, such as exiting light from area 122 of light directing channel 120 exposed through image 150, as illustrated, for example, in FIG. 3A, exiting light from area 222 of light directing channel 220 exposed through image 250, as illustrated, for example, in FIGS. 5A, 5B, and exiting light from area 322 of a respective light directing channel 320 exposed through image 350, as illustrated, for example, in FIGS. 7A, 7B.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An illuminable image, comprising:
a substrate;
a printed transparent light gathering channel printed on the substrate;
a printed transparent light transferring channel printed on the substrate;
a printed transparent light directing channel printed on the substrate; and
a printed image printed directly on at least a portion of the printed transparent light directing channel,
the printed transparent light gathering channel being free of the printed image, and
the printed transparent light transferring channel communicated with the printed transparent light gathering channel and the printed transparent light directing channel to direct light from the printed transparent light gathering channel to the printed transparent light directing channel.

2. The illuminable image of claim 1, further comprising: a light source to illuminate the printed transparent light directing channel.

3. The illuminable image of claim 2, wherein the light source comprises an active light source.

4. The illuminable image of claim 2, wherein the light source comprises ambient light.

5. The illuminable image of claim 1, wherein an area of the printed transparent light directing channel is exposed through the printed image.

6. A method of forming an illuminable image, comprising:
depositing transparent ink on a substrate to form a transparent light directing channel;
depositing transparent ink on the substrate to form a transparent light gathering channel;
depositing transparent ink on the substrate to form a transparent light transferring channel between the transparent light gathering channel and the transparent light directing channel; and
printing an image directly on at least a portion of the transparent light directing channel,
wherein printing the image includes avoiding printing of the image directly on the light gathering channel.

7. The method of claim 6, wherein depositing the transparent ink includes printing a layer of the transparent ink on the substrate, and wherein printing the image includes printing the image on the substrate and directly on the at least a portion of the transparent light directing channel.

8. The method of claim 6, wherein printing the image includes exposing an area of the transparent light directing channel through the image.

9. A method of illuminating an image, comprising:
gathering light with a printed transparent light gathering channel, the printed transparent light gathering channel printed on a substrate;
transferring the light from the printed transparent light gathering channel to a printed transparent light directing channel with a printed transparent light transferring channel, the printed transparent light transferring channel printed on the substrate;
directing the light through the printed transparent light directing channel, the printed transparent light directing channel printed on the substrate; and
illuminating a printed image with the directed light, the printed image printed directly on at least a portion of the printed transparent light directing channel, and the printed transparent light gathering channel being free of the printed image.

10. The method of claim 9, wherein directing light through the printed transparent light directing channel includes directing active light through the printed transparent light directing channel.

11. The method of claim 9, wherein directing light through the printed transparent light directing channel includes directing ambient light through the printed transparent light directing channel.

12. The method of claim 9, wherein illuminating the printed image with the directed light includes exiting light from an area of the printed transparent light directing channel exposed through the printed image.

* * * * *